United States Patent
Hiranaka

(10) Patent No.: US 12,391,613 B2
(45) Date of Patent: Aug. 19, 2025

(54) METHOD FOR RECLAIMING GYPSUM FROM WASTED GYPSUM BOARDS

(71) Applicant: Tokuyama Corporation, Shunan (JP)

(72) Inventor: Shingo Hiranaka, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 17/773,088

(22) PCT Filed: Oct. 29, 2021

(86) PCT No.: PCT/JP2021/040097
§ 371 (c)(1),
(2) Date: Apr. 29, 2022

(87) PCT Pub. No.: WO2023/032233
PCT Pub. Date: Mar. 9, 2023

(65) Prior Publication Data
US 2024/0140865 A1  May 2, 2024

(30) Foreign Application Priority Data
Sep. 2, 2021 (JP) .................... 2021-143116

(51) Int. Cl.
*C04B 11/26* (2006.01)
*C04B 11/00* (2006.01)

(52) U.S. Cl.
CPC .................. *C04B 11/26* (2013.01)

(58) Field of Classification Search
CPC ......... C04B 11/26; C04B 11/262; B09B 3/30; B09B 3/35; B06B 3/40; Y02W 30/58
See application file for complete search history.

(56) References Cited

U.S. PATENT DOCUMENTS 10,562,787 B2 * 2/2020 Hoek ................. B01D 61/12

FOREIGN PATENT DOCUMENTS

| JP | 48-66073 A | 9/1973 |
| JP | 10-128054 A | 5/1998 |

(Continued)

OTHER PUBLICATIONS

Kiso et al. Wastewater treatment performance of a filtration bioreactor equipped with a mesh as a filter material, Water Research, 34, pp. 4143-4150. (Year: 2000).*

(Continued)

*Primary Examiner* — Amber R Orlando
*Assistant Examiner* — Anastasia A. Kuvayskaya
(74) *Attorney, Agent, or Firm* — Keating & Bennett, LLP

(57) ABSTRACT

Wasted gypsum boards are crushed and heated to convert semi-hydrated gypsum and/or anhydrous type III gypsum, and the obtained semi-hydrated gypsum and/or anhydrous type III gypsum is mixed with gypsum slurry. The gypsum slurry is solid/liquid separated by a filtration device into gypsum particles and filtrate which has passed through the filter cloth of the filtration device. The filtrate is returned into the gypsum slurry. The solid/liquid separation is performed such that the concentration of the suspended solid in the filtrate that has passed through the filter cloth and consists of gypsum granules and inorganic impurities derived from wasted gypsum boards is made 1000 to 8000 mass ppm. The clogging of the filter cloth is reduced.

4 Claims, 3 Drawing Sheets

(56) References Cited

FOREIGN PATENT DOCUMENTS

| | | | | | |
|---|---|---|---|---|---|
| JP | 2006036494 | A | * | 2/2006 | ............. B65G 21/20 |
| JP | 2020065975 | A | * | 4/2020 | |
| WO | 2012/176688 | A1 | | 12/2012 | |

OTHER PUBLICATIONS

JP 2006036494 A, Machine Translation (Year: 2006).*
JP 2020065975 A, Machine Translation (Year: 2020).*

* cited by examiner

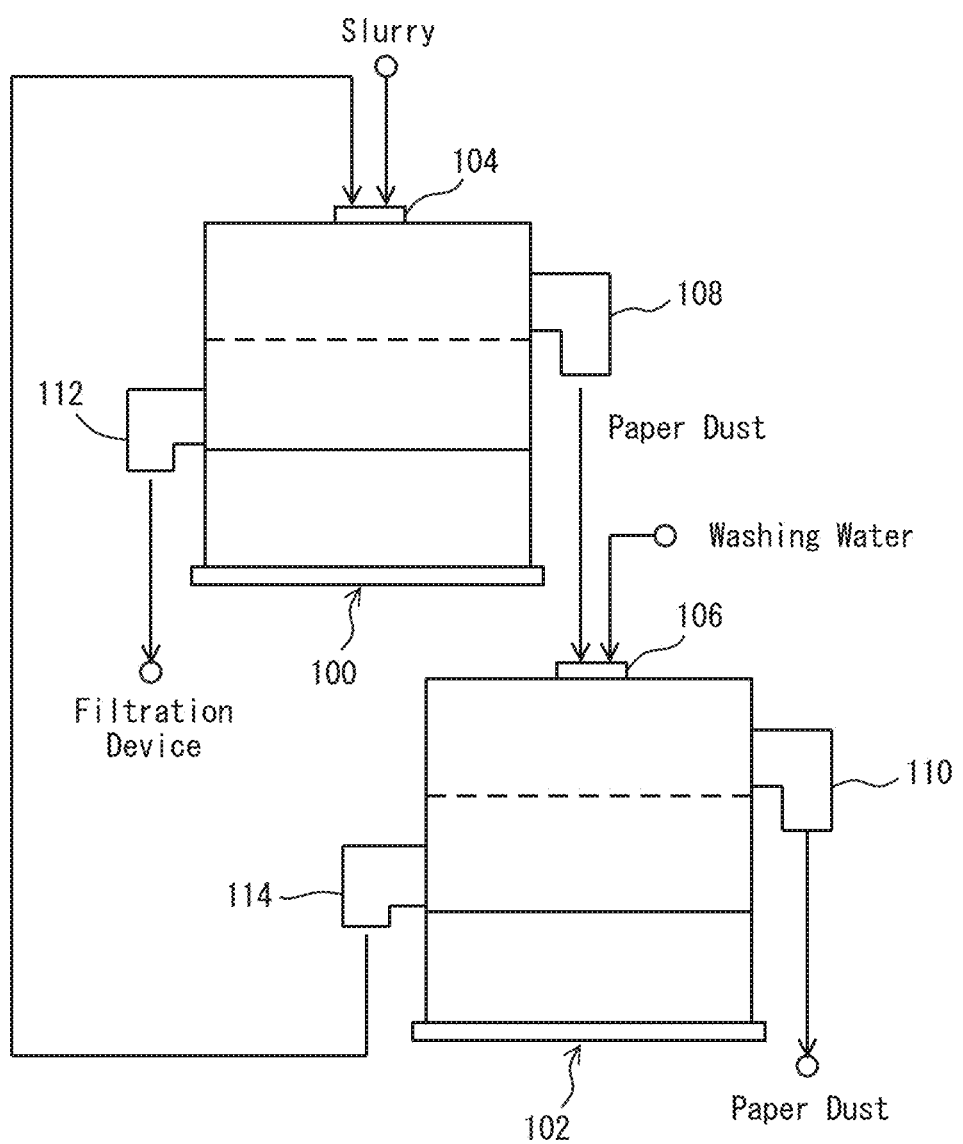

METHOD FOR RECLAIMING GYPSUM FROM WASTED GYPSUM BOARDS

FIELD OF THE INVENTION

The present invention relates to a method for reclaiming gypsum from wasted gypsum boards.

BACKGROUND ART

The inventor has proposed to reclaim gypsum from wasted gypsum boards (Patent Document 1: WO2012/176688). The wasted gypsum boards are crushed to separate into gypsum granules and paper pieces. The gypsum granules are then heated to convert them into semi-hydrated and/or anhydrous Type III gypsum. The converted gypsum is mixed with an aqueous medium to form a gypsum slurry, and gypsum particles are precipitated in the slurry. The precipitated gypsum granules are then filtered out of the gypsum slurry by a filtration device, and the filtrate is returned into the gypsum slurry. The resulting gypsum powder is used as a raw material for gypsum boards, cement, or the like. The gypsum powder can be used as a raw material for gypsum board, cement, etc. The paper pieces in the gypsum boards are also worth reclaiming.

PRIOR DOCUMENTS LIST

Patent Document

Patent Document 1: WO2012/176688

SUMMARY OF THE INVENTION

Problem to be Solved by the Invention

The inventor has often experienced that the filter cloth of the filtration device became clogged. In addition, when the clogged filter cloth was washed with water, it could not be regenerated easily. Although the filter cloth could be regenerated by using an extremely large amount of water, the washing water was to be discharged from the gypsum reclamation system to the outside, and this required wastewater treatment.

In the reclamation of gypsum from wasted gypsum boards, the filtrate from the filtration device was observed. The filtrate contained a large amount of suspended solid, and the major components of it were fine gypsum granules, fine particles of calcium carbonate, mica, and fine particles derived from fine aggregate such as gravel, which passed through the filter cloth. When vinyl chloride wallpapers had been attached to gypsum boards, calcium carbonate contained in the filler of wallpapers was mixed into the gypsum slurry. Sometimes, mortar was applied to wasted gypsum boards for design purposes and the mortar contained mica and various fine aggregates. These inorganic impurities were trapped by the filter cloth and clogged it.

Fine gypsum particles and inorganic impurities derived from wasted gypsum boards clog the filter cloth. Of these, gypsum particles are water-soluble and can be removed by washing the filter cloth with water. However, calcium carbonate, mica, and fine particles derived from fine aggregate are generally insoluble in water, and it is difficult to regenerate the filter cloth by water washing.

The problem to be solved by the invention is to reduce the clogging of the filter cloth of the filtration device due to the inorganic impurities derived from wasted gypsum boards.

Means for Solving the Problem

According to the invention, gypsum is reclaimed from wasted gypsum boards by: crushing and heating wasted gypsum boards to produce semi-hydrated gypsum and/or anhydrous type III gypsum; mixing said semi-hydrated gypsum and/or anhydrous type III gypsum with gypsum slurry; solid/liquid separating the gypsum slurry by a filtration device into gypsum particles and filtrate which has passed through the filter cloth of the filtration device; and returning the filtrate into the gypsum slurry. The invention is characterized in that the concentration of the suspended solid in the filtrate that has passed through the filter cloth and comprises or consists of gypsum granules and inorganic impurities derived from wasted gypsum boards is made 1000 to 8000 mass ppm in the solid/liquid separation.

The inventor has confirmed that if filtration conditions, such as the type of filter cloth, are selected such that the concentration of suspended solid in the filtrate is 1000 to 8000 mass ppm, clogging of the filter cloth is reduced, and the filtration efficiency of gypsum particles is kept within a practical range. Filter presses, belt filters, drum filters, and so on are usable as the filtration device. The air permeability for making the concentration of suspended solid in the filtrate 1000 to 8000 mass ppm depends and varies according to the species of filtration devices. Therefore, the concentration of suspended solid in the filtrate is specified instead of the air permeability of the filter cloth. While the concentration of suspended solid in the filtrate is as high as 1000 to 8000 mass ppm, however, since the filtrate is returned to the gypsum slurry, no environmental pollution will occur. In the specification, when a range is specified as "A to B" or the like, the upper and lower limits are included.

Preferably, a belt conveyor is provided to convey a cake comprising the gypsum particles after the solid/liquid separation, and a scraper made of fluoroplastic or urethane resin is provided at the tip end of the exit of the belt conveyor to detach the cake from the belt. Since gypsum particles after the solid/liquid separation are wet and may not fall off at the exit of the conveyor while adhering to the belt of the belt conveyor. Therefore, the gypsum granules are peeled off from the scraper. The inventor has confirmed that, when a fluoroplastic or urethane resin scraper is used, the belt wear is reduced.

Preferably, the gypsum slurry is sieved by at least two vibrating sieves comprising, at least, a first stage and a second stage. The gypsum slurry and the under-sieve component of the second stage vibrating sieve are supplied to an inlet of the first stage vibrating sieve, and the under-sieve component of the first stage vibrating sieve is supplied to the filtration device. The upper-sieve component of the first stage vibrating sieve and washing water are supplied to an inlet of the second stage vibrating sieve, and the under-sieve component of the second stage vibrating sieve is returned to the inlet of the first stage vibrating sieve. Paper dust is reclaimed from the upper-sieve component of the second stage vibrating sieve.

Since the gypsum slurry contains the paper dust, the paper dust is sieved before filtration. Since gypsum slurry is slow to pass through a sieve and tends to stay on the sieve. Therefore, a vibrating sieve which performs strong vertical vibration and prevents gypsum slurry from staying on the sieve, is used. The paper dust obtained as the upper-sieve component of the vibrating sieve includes adhering gypsum powder, but when the paper dust is washed with washing water, waste water is generated. Therefore, the paper dust separated by the first stage sieve and washing water are supplied to the inlet of the second stage vibrating sieve, and the paper dust is washed. The used washing water as the under-sieve component of the second stage vibrating sieve is returned to the inlet of the first stage vibrating sieve. Then, paper dust with a reduced amount of adhering gypsum is reclaimed since the concentration of the gypsum slurry is lowered by the first stage vibrating sieve. The under-sieve component of the first stage vibrating sieve is supplied to the filtration device to reclaim gypsum powder. While the washing water is eventually supplied to a crystallization tank or the like, if the washing water is within a range of crystallization water and adhering water of the gypsum powder, the washing water does not generate exhaust water to the outside.

BRIEF DESCRIPTION OF THE DRAWINGS

FIG. 3: A diagram indicating a vibrating sieve used in the embodiment.

FEATURES FOR CARRYING OUT THE INVENTION

Figure 1:
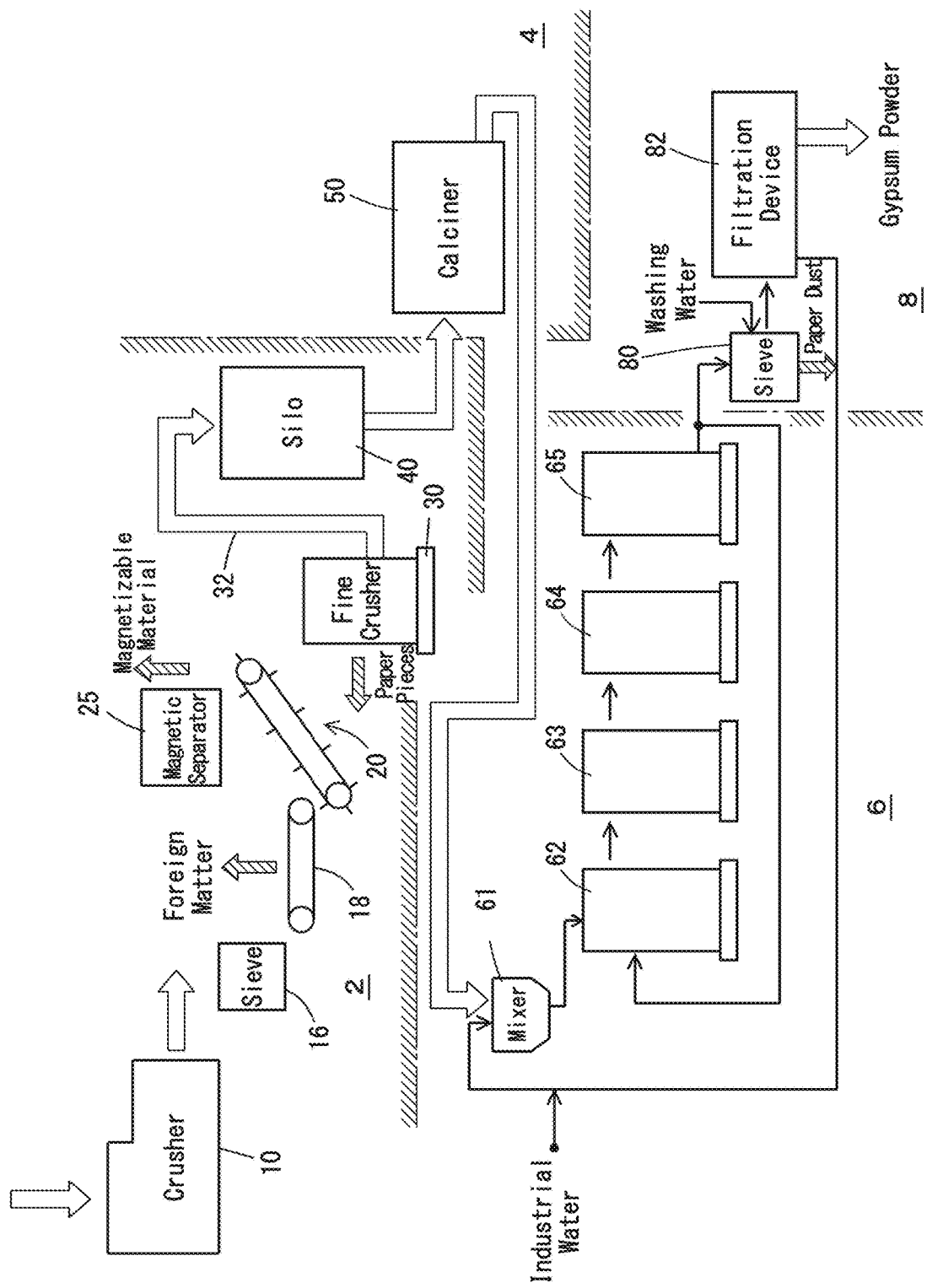
FIG. 1: An overview indicating a method for reclaiming gypsum from wasted gypsum boards.

An embodiment of the invention will be described. The scope of this invention should be construed based on the claims with reference to the description in the specification and the well-known art in this field, according to the understanding of those skilled in the art. The scope of the invention is not limited to the embodiment.
Embodiment
FIGS. 1 to 3 indicate an embodiment. FIG. 1 indicates the steps from the crushing of wasted gypsum boards to the collection of gypsum powder. In the pre-processing step, wasted gypsum boards are crushed by a crusher 10, and foreign matter in the wasted gypsum boards is separated by a sieve 16. Foreign matter is further separated on a sorting conveyor 18, and gypsum granules are conveyed in predetermined quantities by a metering conveyor 20. Then, a magnetic separator 25 separates magnetizable materials such as metals, and a fine crusher 30 crushes the gypsum granules into smaller granules. The gypsum granules are then fed from the magnetic separation pipe 32 which is provided with a magnet for magnetic separation, to the silo 40 for stocking. In the heating step 4, the gypsum granules are heated by a calciner 50 and converted into semi-hydrated gypsum and/or anhydrous type III gypsum. In the crystallization step 6, the thermally treated gypsum granules are mixed with an aqueous medium in a mixer to form a gypsum slurry. Then, gypsum granules are precipitated in, for example, four-staged crystallization tanks 62-65. In the filtration step 8, the gypsum slurry from the crystallization tank 65 and so on is dealt with a vibrating sieve 80 to separate paper dust, and the gypsum slurry passed through the sieve is fed to the filtration device 82 to filter the gypsum powder. Further, washing water is supplied to the vibrating sieve 80 to reduce the amount of gypsum adhering to the paper dust to be collected. Steps other than the filtration step 8 are not a part of the invention.

Figure 2:
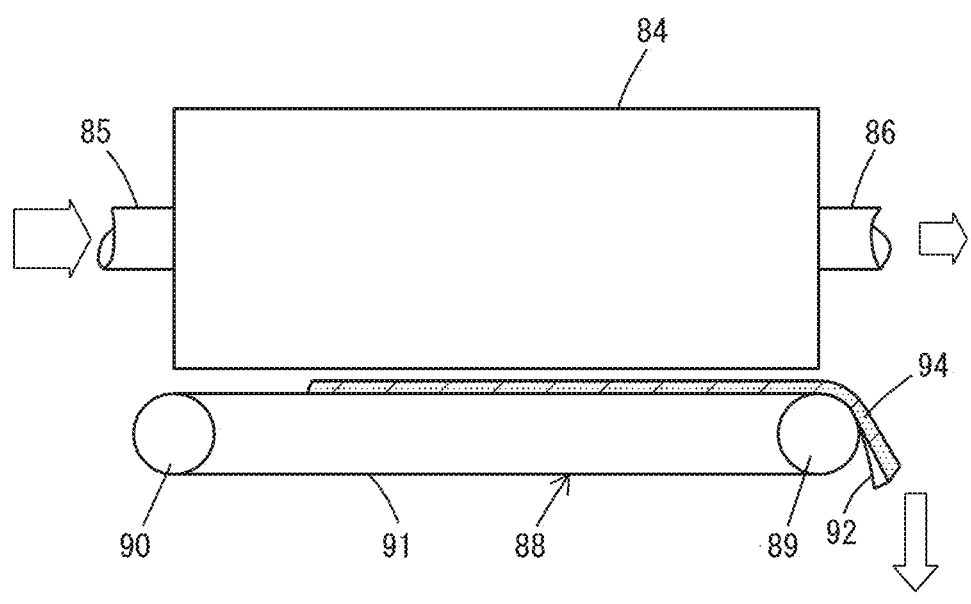
FIG. 2: A schematic side view indicating the filtration device used in the embodiment.

FIG. 2 indicates the filtration device 82. In a solid/liquid separator 84, gypsum slurry is supplied from the slurry inlet 85 and the filtrate is discharged from the filtrate outlet 86. The gypsum powder after the solid/liquid separation is dropped and conveyed, for example, on a belt conveyor 88. Indicated by 89 and 90 are pulleys. Indicated by 91 is a belt and is made of, for example, natural rubber or styrene-butadiene rubber. In front of the exit pulley 89, a scraper 92 made of fluoroplastic or urethane resin is brought into contact with the belt 91 to remove the gypsum cake 94 from the belt 91. The scraper 92 made of fluoroplastic or urethane resin hardly wears down the belt 91. When multiple belt conveyors are connected, it is preferable to provide the scraper 92 at the exit side of each belt conveyor.

The solid/liquid separator such as a filter press, belt filter, or drum filter pressurizes the gypsum slurry and separates it by a filter cloth. Here, the filtering is performed not only by the filter cloth but also by the filtered gypsum powder cake. In order to keep the concentration of suspended solid in the filtrate between 1000 and 8000 mass ppm, the air permeability of the filter cloth is preferably in the following range. Here, the air permeability of the filter cloth indicates the volume of air (in cm 3) that passes through a unit surface area of 1 cm 2 of the filter cloth per second under a pressure equivalent to 12.7 mmAq. The following indicates the preferred air permeability of the filter cloth for each type of solid/liquid separator.

Filter press: 1 to 20
Belt filter: 4 to 30
Drum filter: 10 to 80

The types of weave of the filter cloth is arbitrary, and the material of the filter cloth is arbitrary as long as it does not affect the pH of the gypsum slurry. Monofilament fibers are preferred for the filter cloth, since multifilament fibers allow the suspended solid to enter between the filaments. The clogged filter cloth can be regenerated by washing with water, but it is important to extend the period of time before clogging occurs.

The concentration of suspended solid in the filtrate is determined, for example, by filtering a predetermined amount of slurry through a glass fiber filter paper with a pore diameter of about 1 micro m, drying the filter paper at 105 degree Celsius to 110 degree Celsius, and weighing the weight increase.

When the gypsum slurry is filtered through a filter cloth such that the concentration of suspended solid in the filtrate is less than 1000 mass ppm, the filter cloth traps the inorganic impurities trapped including submicron particles. These extremely fine particles are difficult to remove once they clog the filter cloth. The concentration of suspended solid is reduced by using a filter cloth with low air permeability. In general, filter cloths with low air permeability have a multi-layered structure, an increased thickness, and become easily clogged. When a filter cloth with this condition is used in a plant operating continuously for 24 hours a day, the clogging becomes worse in about one to three months such that the filter cloth has to be replaced. On the other hand, when a filter cloth whose filtrate has a suspended solid concentration greater than 8,000 mass ppm is used, the amount of inorganic impurities not captured by the filter cloth increases, and the amount of inorganic impurities circulating through the crystallization and filtration steps continues to increase. While this increases the life of the filter cloth but is unsuitable because the steps cannot be kept in steady states. When the concentration of suspended solid is kept in the range of 1000 to 8000 mass ppm, the concentration of inorganic impurities is kept in a constant steady range, although it may change slightly over time. When a filter cloth whose filtrate has a suspended solid concentration in the above range is used, the filter cloth can be used for 12 to 24 months.

FIG. 3 indicates a two-stage vibrating sieve 80. 100 is the first stage vibrating sieve, 102 is the second stage vibrating sieve, and so on. 100 is a first stage vibrating sieve, 102 is a second stage vibrating sieve, and 104 and 106 are inlets to the vibrating sieves 100, 102. 108 and 110 are outlets of the upper-sieve component of the sieve, 112 and 114 are the outlets of the under-sieve component.

The gypsum slurry from the inlet 104 of the sieve 100 and the second stage of the vibrating sieve 102 from the outlet of the under-sieve component of the sieve. Then, paper dust from the outlet 108 of the sieve 100 is fed to the second stage sieve 102 along with washing water. In the second stage sieve 102, the paper flour is washed by the washing water and the stone dust to the paper flour from the outlet 110 is fed to the second stage sieve 102. In the second sieve 102, the paper dust is washed by the washing water, and the amount of gypsum adhering to the paper dust from the outlet 102 can be reduced. This increases the industrial value of the collected paper dust.

The washing water used in the second stage sieve 102 is collected from the outlet 114 and added to the first stage sieve 100. Therefore, the concentration of gypsum slurry in the first sieve 100 is reduced, and the paper dust from the outlet 108 carries a smaller amount of gypsum. From the outlet 112 of the first sieve 100, gypsum slurry carrying the reduced amount of paper dust and diluted by the washing water is obtained. This gypsum slurry is filtered by the filtration device.

A part of the used washing water is returned to the mixer 61 or the crystallization tank 62-65. Preferably, the water used to wash the filter cloth is also returned to the crystallization process 6. In the filtration process 8, water is taken out of the gypsum recovery system as the crystalline water and adherent water of the reclaimed gypsum powder. By limiting the amount of water washing the filter cloth and the vibrating sieve 102 within this range, no waste water is discharged to the outside.

LIST OF SYMBOLS 2 pre-processing step
4 heating step
6 crystallization step
8 filtration step
10 crusher
16 sieve
18 sorting conveyor
20 metering conveyor
25 magnetic separator
30 fine crusher
32 magnetic separation pipe
40 silo
50 calciner
61 mixer
62-65 crystallization tank
80 sieve
82 filtration device
84 solid/liquid separator
85 slurry inlet
86 filtrate outlet
88 belt conveyor
89, 90 pulley
91 belt
92 scraper
94 cake
100, 102 vibrating sieve
104, 106 inlet
108, 110 outlet of upper-sieve component
112, 114 outlet of under-sieve component.

What is claimed is:

1. A method for reclaiming gypsum from wasted gypsum boards comprising:
   crushing and heating wasted gypsum boards to produce semi-hydrated gypsum and/or anhydrous type III gypsum;
   mixing said semi-hydrated gypsum and/or anhydrous type III gypsum with gypsum slurry;
   solid/liquid separating the gypsum slurry by a filtration device into gypsum particles and filtrate which has passed through a filter cloth of the filtration device such that a concentration of suspended solid in the filtrate that has passed through the filter cloth and comprises gypsum granules and inorganic impurities derived from the wasted gypsum boards is made 1000 to 8000 mass ppm;
   returning the filtrate into the gypsum slurry;
   sieving the gypsum slurry by at least a first stage vibrating sieve and a second stage vibrating sieve before the solid/liquid separation;
   supplying the gypsum slurry and under-sieve component of the second stage vibrating sieve to an inlet of the first stage vibrating sieve, and supplying the under-sieve component of the first stage vibrating sieve to the filtration device; and
   supplying upper-sieve component of the first stage vibrating sieve and washing water to an inlet of the second stage vibrating sieve, returning the under-sieve component of the second stage vibrating sieve to the inlet of the first stage vibrating sieve, and reclaiming paper dust from the upper-sieve component of the second stage vibrating sieve.

2. The method for reclaiming gypsum from wasted gypsum boards according to claim 1, further comprising:
   conveying a cake comprising the gypsum particles after the solid/liquid separation by a belt conveyor; and
   detaching the cake from the belt conveyor by a scraper made of fluoroplastic or urethane resin and provided at a tip end of an exit of the belt conveyor.

3. The method for reclaiming gypsum from wasted gypsum boards according to claim 1, wherein said suspended solid consists of gypsum granules and inorganic impurities derived from the wasted gypsum boards.

4. The method for reclaiming gypsum from wasted gypsum boards according to claim 1, wherein the gypsum slurry and the under-sieve component of the second stage vibrating sieve is supplied directly to the inlet of the first stage vibrating sieve.

* * * * *